United States Patent [19]

Breimesser et al.

[11] 4,175,238

[45] Nov. 20, 1979

[54] SWITCHING ARRANGEMENT FOR REMOTE-CONTROLLED ELECTRICAL LOADS

[75] Inventors: Fritz Breimesser, Erlangen; Christian Kuznia; Karl-Ulrich Stein, both of Munich, all of Fed. Rep. of Germany

[73] Assignee: Siemens Aktiengesellschaft, Berlin & Munich, Fed. Rep. of Germany

[21] Appl. No.: 727,240

[22] Filed: Sep. 27, 1976

[30] Foreign Application Priority Data

Sep. 26, 1975 [DE] Fed. Rep. of Germany ....... 2543028

[51] Int. Cl.[2] .................... H02J 4/00

[52] U.S. Cl. .................... 307/40; 307/147

[58] Field of Search .................... 307/147, 40, 11, 18, 307/29, 39, 157; 340/310 R, 310 A, 168 R, 168 S; 315/361, 362

[56] References Cited

U.S. PATENT DOCUMENTS

| | | | |
|---|---|---|---|
| 3,739,187 | 6/1973 | Pottle | 307/29 |
| 3,829,706 | 8/1974 | Seip | 307/147 |

*Primary Examiner*—Gene Z. Rubinson
*Assistant Examiner*—Morris Ginsburg
*Attorney, Agent, or Firm*—Hill, Van Santen, Steadman, Chiara & Simpson

[57] ABSTRACT

A switching arrangement for remote-controlled electrical loads employing command transmitters, each of which is operatively connected to a switching device for control of a load over cooperable coder and decoders which are connected by electric lines, with the coded signal being supplied over a transmission channel to the decoder which converts the coded signal into a switching signal, operative to actuate the switching device with the construction being such that standardizable components and connection lines may be utilized in the system.

52 Claims, 10 Drawing Figures

SWITCHING ARRANGEMENT FOR REMOTE-CONTROLLED ELECTRICAL LOADS

BACKGROUND OF THE INVENTION

The invention relates to a switching arrangement for remote controlled electrical loads which may be selectively actuated either individually or in groups by at least one command transmitter providing a control signal, from one or a plurality of stations, with the signal being conducted over a low voltage circuit to the switching device, which in turn is operatively connected over electrical lines to at least one electrical load device.

A switching arrangement of this type is described in U.S. Pat. No. 3,829,706, which discloses a converter, operative to convert and amplify command transmitter signals, disposed in a low voltage circuit. The converter is connected to extremely flat command transmitters which are free of wall housings, etc. by foil lines adapted to carry voltages of less than 4 volts and a switching power of less than 1 watt. The converter, in turn, is connected to the switching device by lines adapted to carry voltages of between 4 and 24 volts, with the switching device being adapted to control load devices involving voltages greater than 24 volts, for example 220 volts. The foil lines, constructed in known manner, may be in the form of a flat strip which can be utilized without wall channels, conduits and the like, and disposed virtually flush on the mounting base, for example, a wall or the like.

The command transmitters may also be secured, for example, by gluing, to their cooperable base structures, with the transmitters, per se, being in the form of mechanical-electrical energy converters, particularly Hall generators, field plates or piezo-crystals. It is also possible to employ inductive or capacitive transmitters, as well as structures employing mechanical contacts. In such an arrangement, a separate line is required for each load device or for each group of load devices and their associated command transmitters. Consequently, the number of conductors in the foil line must, for example, be equal to the number of the load devices to be controlled. Further, the foil connection lines between a command transmitter and converter must be so designed that the length thereof will not be too great. For example, when capacitive transmitters are employed, the problem arises that the line capacitance of the connection lines must be small in comparison to the capacitance of the transmitter. For economical reasons, a further problem exists in connection with the standardizing of components, switching devices, converter and command transmitters, as well as the connection lines between the respective components.

SUMMARY OF THE INVENTION

The invention therefore has among its objectives the production of a switching arrangement, of the general type described, which eliminates disadvantages of such prior devices and at the same time enables the utilization of standardizable components and standardizable connection lines between the respective components.

This objective is achieved in a switching arrangement of the type described by the disposition, in the low voltage circuit between the command transmitter and the switching device, at least one coder which is connected by electric lines to the command generator, and which converts the switching signal produced by the command transmitter into a coded signal, and at least one decoder which is disposed between the coder and switching device, which is connected by electric lines to the coder and by electric lines to the switching device. The coded signal is supplied from the coder to the decoder over a transmission channel, whereby the decoder is operable to convert the coded signal into a switching signal, which is operative to actuate the associated switching device.

The invention advantageously permits the production of embodiments in which the connection lines between the components may involve a fixed number of lines which is independent of the number of command transmitters and load devices involved. Foil lines or multiwire lines containing a fixed number of conductors therefor can be utilized. Further, the switching arrangement, in accordance with the invention, can be so designed that, apart from the connection lines, a maximum of merely three component types are required. Advantageously, one component type may be in the form of an actuating component comprising a structural combination of the command transmitter and coder, a second type in the form of a switching component which comprises a structural combination of the switching device and the decoder, and a third type in the form of a central control or actuating component comprising a central decoder for use with a plurality of switching devices. Connection lines of arbitrary length can be used between the respective components and the switching devices which in accordance with the invention, can be constructed with purely electronic components. The use of digital-coded signals affords the known advantages of digital technology (operating reliability, integrated circuits, saving in space, low power loss, high economy) to be achieved. It also facilitates the design of extremely flat actuating components.

In addition, a switching arrangement in accordance with the invention can be readily safeguarded against a miscoding, in particular against a miscoding by simultaneous actuation of two command generators, or can be readily safeguarded without impairment of the above referred to advantages without a large additional outlay. The installation of a switching arrangement in accordance with the invention is extremely simple and can be readily and effortlessly accomplished in sections even by an inexperienced person.

BRIEF DESCRIPTION OF THE DRAWINGS

In the drawings wherein like reference characters indicate like or corresponding parts.

DETAILED DESCRIPTION OF PREFERRED EMBODIMENTS OF THE INVENTION

Figure 1:
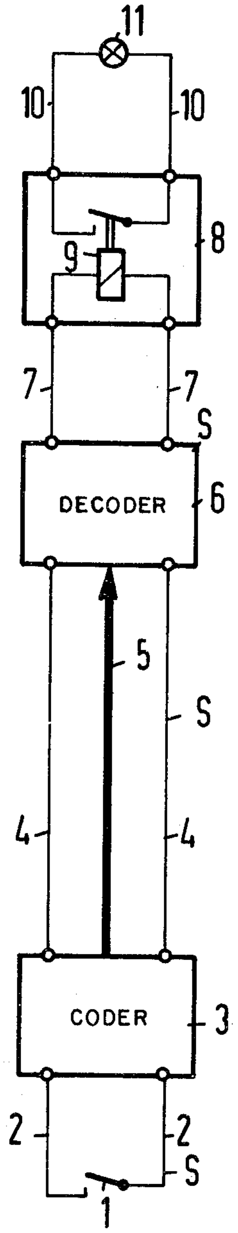
FIG. 1 is a block diagram of the basic construction of a switching arrangement in accordance with the invention.

Referring to the drawings and more particularly to FIG. 1, there is illustrated therein the basic construction of a switching arrangement in accordance with the invention. A command transmitter 1 is connected to a switching device 8 by a low voltage circuit S comprising an outgoing line and a return line, with the switching device containing a power switch 9, for example a triac or an impulse relay, which controls a load device 11, disposed in the load circuit 10 which thus may switch the load device 11 as desired. Disposed in the low voltage circuit S, between the command transmitter 1 and the switching device 8, is a coder 3, and disposed between the coder 3 and the switching device 8 is a decoder 6. The coder 3 is connected by lines 2 to the command transmitter and by lines 4 to the input side of the decoder 6. The latter in turn is connected by lines 7 to the switching device 8.

The signal produced by the coder, in response to actuation of the command transmitter 1, is supplied over a transmission channel 5 to the decoder 6 which converts the coded signal into a switching signal operative to actuate the switching device 8. In this arrangement, it is advantageous to combine the command transmitter 1 and the coder to form a single actuating component and to combine the decoder and switching device to form a single switching component. Likewise, it is advantageous for the actuating component and the switching component to incorporate connection units for multi-wire lines, particularly foil lines. Either light signals or electric signals are suitable for use as the signal and may involve digital signals, multi-stage digital signals or correspondingly amplitude-modulated or frequency modulated analogue signals. The use of a digitally coded signal is particularly advantageous, preferably electrical digital signals being employed which are transmitted as a coded pulse sequence in serial fashion on a pair of lines or as coded digital words present in quasi-statical manner at parallel outputs of the coder, in parallel on multi-wire lines. In the event that sequences of digital pulses are employed as coded signals, it is advantageous to employ a central pulse generator for the production of digital timing pulses.

Figure 2:
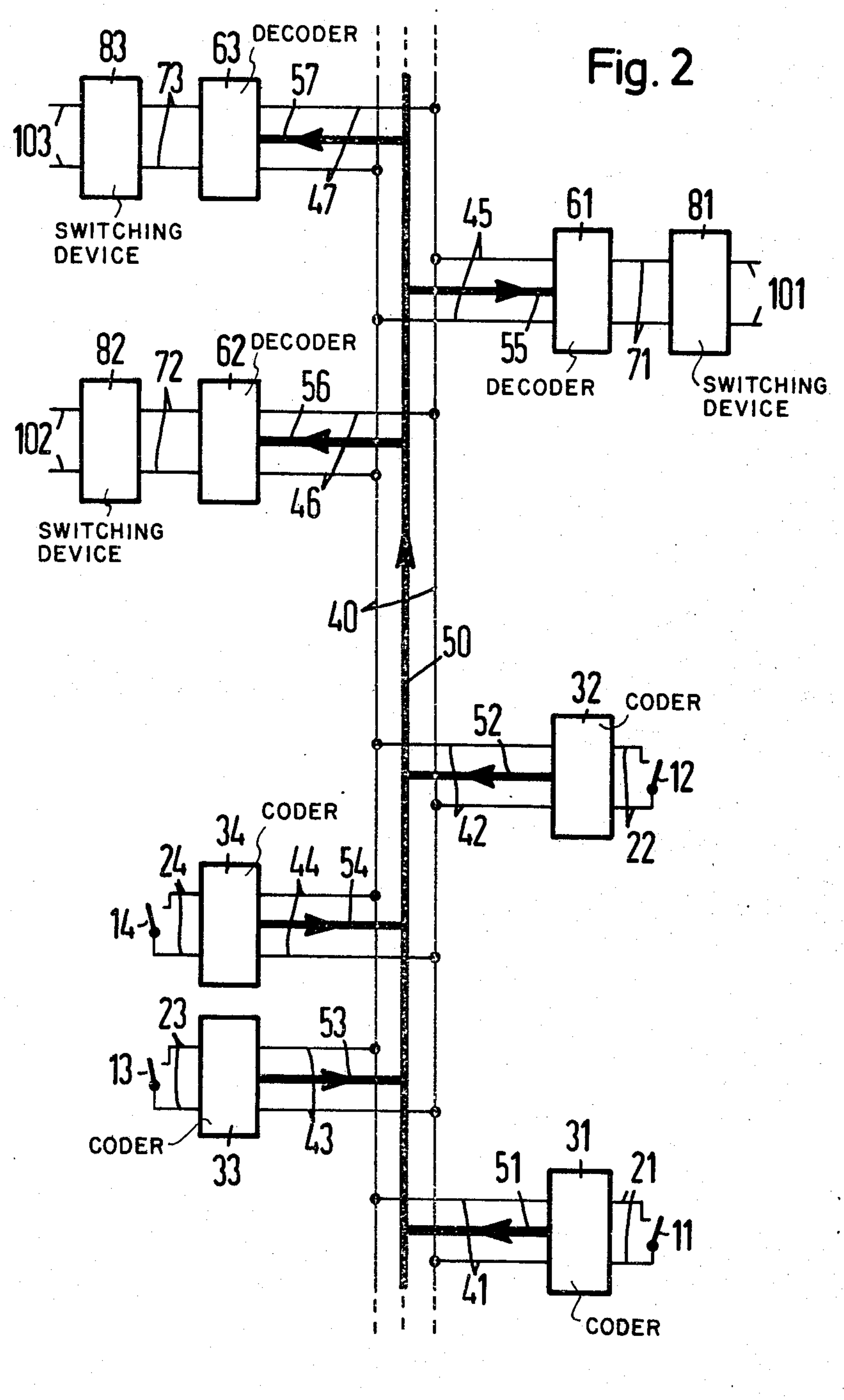
FIG. 2 illustrates a portion of a circuit incorporating a plurality of command transmitters and a plurality of switching devices.

FIG. 2 illustrated an expedient construction of a switching arrangement in accordance with the invention employing a plurality of command transmitters and a plurality of switching devices in which the low voltage circuit S of FIG. 1 comprises a ring line 40 to which each coder 31 to 34 is connected over branch lines 41 to 44, while each decoder 61 to 63 is connected to the ring line over branch lines 45 to 47. The command transmitters 11 to 14 are connected over lines 21 to 24 to the respective coders, with the switching devices 81 to 83 being connected over lines 71 to 73 to the decoders 61 to 63. The respective switching devices are connected over corresponding supply lines 101 to 103 to the load devices, not illustrated in FIG. 2. If the coded signals produced by the respective coders are transmitted over lines to the cooperable decoders, it is advantageous in this arrangement to design the transmission channel as a main channel 50 from which branch channels 51 to 54 extend to the respective coders 31 to 34 and branch channels 55 to 57 extend to the respective decoders 61 to 63.

Figure 3:
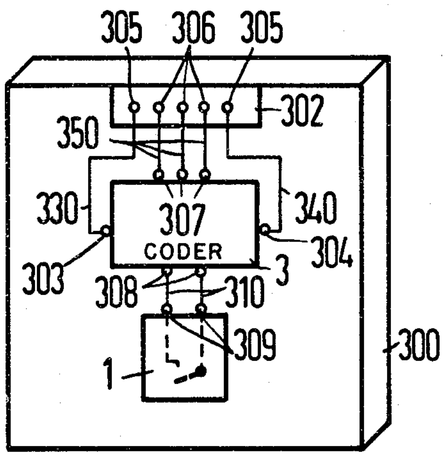
FIG. 3 schematically illustrates the construction of an actuating component.

FIG. 3 illustrates a particularly advantageous construction of an actuating component, employing a thin carrier plate 300, preferably having a maximum thickness of 5 mm, on which is schematically represented the command transmitter 1, coder 3, and a connection unit 302 having terminals 305 and 306, the terminals 305 of which are connected to the supply terminals 303 and 304 of the coder by electric lines 330 and 340, and the terminals 306 of which are connected by electric lines 350 to the outputs 307 of the coder. The number of individual terminals of the connection unit will, of course, depend upon the character of the coded signals. Likewise, the terminals 306 may be omitted when means other than lines are employed in the transmission.

The connection unit can be in the form of a quick-connect terminal assembly for multi-wire lines, preferably foil lines, and the coder preferably is in the form of an integrated circuit, while the lines 310, 330, 340 and 350 expediently are in the form of a printed circuit.

This arrangement provides an extremely flat construction which can be disposed without problems on a base, for example, by gluing or the like. It also facilitates fast and problem-free connection to the multi-wire lines, in particular foil lines. The coder preferably is constructed as a monolithically integrated semiconductor chip which may be connected without the use of additional wiring, by soldering and chips of this type generally possess a thickness of less than 0.5 mm. It will be appreciated that such construction has the important advantage that where a large number of components are involved, the actuating component may be produced at a favorable cost.

Figure 4:
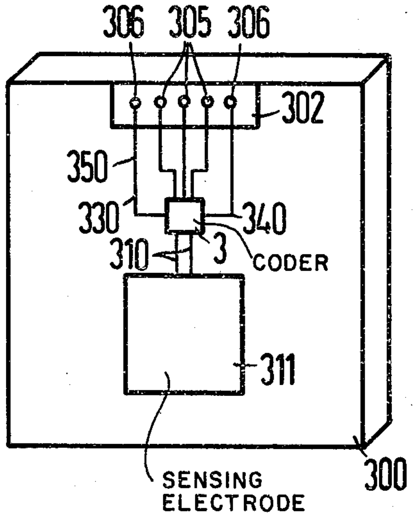
FIG. 4 illustrates a modified construction of an actuating component.

FIG. 4 illustrates an actuating component, similar in construction to that of FIG. 3, in which the command transmitter is in the form of a capacitor having variable capacitance, utilizing a capacitor electrode 311 designed as a sensing electrode. In this construction the command transmitter 3 is in the form of an integrated circuit and disposed below the sensing electrode 311 is a counter-electrode. Each of the lines 310 is connected to a capacitor electrode, and the terminals 305 and 306 of the connection unit are connected as illustrated in FIG. 3 to corresponding terminals of the integrated circuit. The thickness and configuration of the carrier plate is of no importance, insofar as the functioning capacity of the command transmitter is concerned, and the carrier plate can be designed in such a manner that two insulating layers enclose a metal plate or metal foil, with the metal plate being connected, for example, to ground and functioning as a counter-electrode. The coder can include a high-frequency generator and a bridge circuit which is detuned if it is in the vicinity of or contacts the sensing electrode. In another possibility the coder may include an oscillator whose frequency is determined by the capacitance between the sensing electrode and the second capacitor electrode, preferably ground. Yet another possibility involves the inclusion in the coder of an oscillator, the oscillation of which is either initiated or discontinued in dependence upon the capacitance at the externally connected capacitor of variable capacitance.

Figure 5:
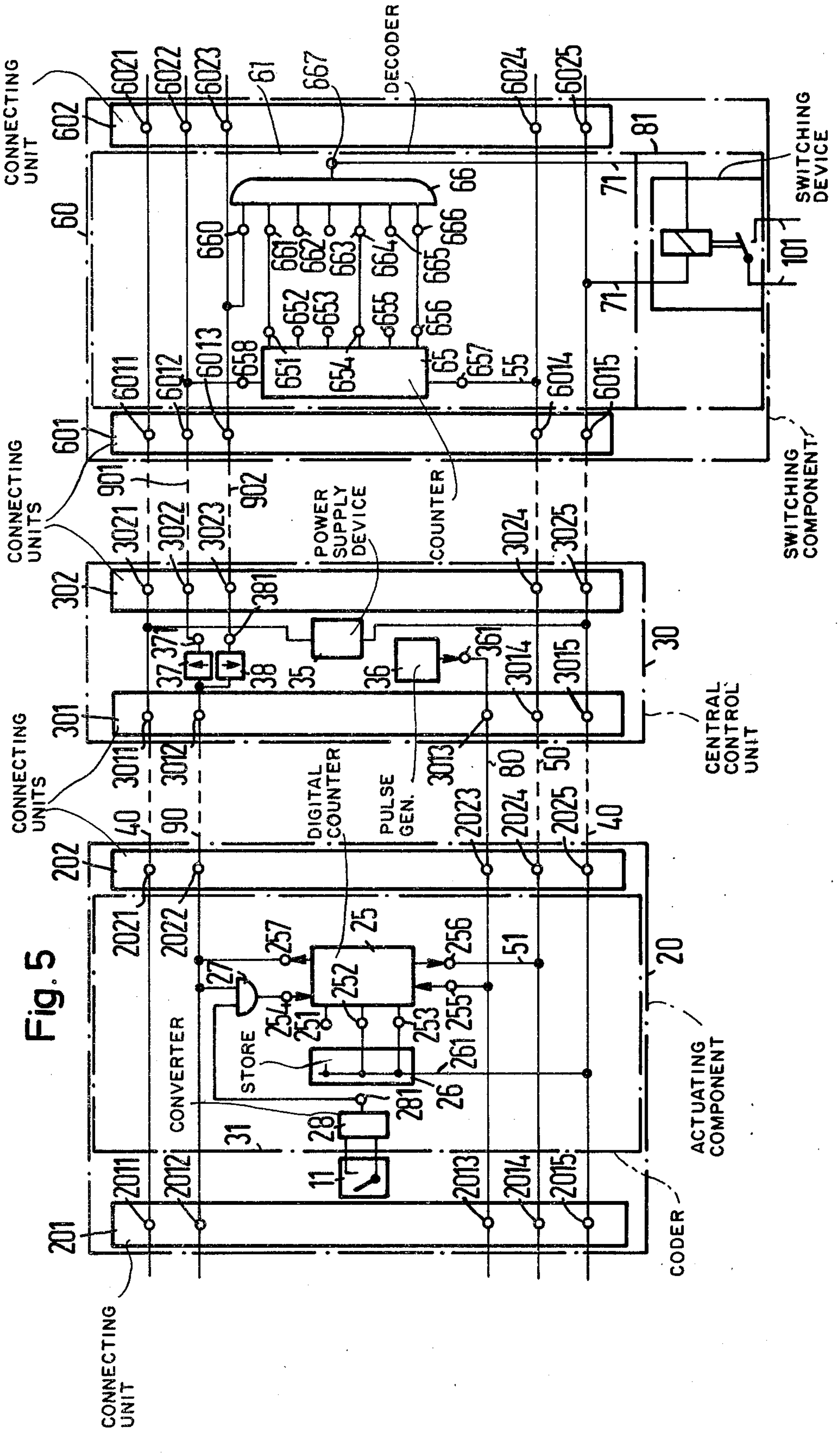
FIG. 5 is a circuit diagram of a switching arrangement, corresponding to FIG. 2, which operates with coded pulse sequences.

FIG. 5 illustrates an advantageous construction of a switching device, such as illustrated in FIG. 2, which utilizes coded pulse sequences. For the purposes of simplicity, only a single representative coder 31 having a command transmitter 11, and a single decoder 61 in conjunction with a switching device 81, are illustrated in the figure. The coder and command transmitter are structurally combined to form an actuating component 20, and the decoder and the switching device are structurally combined to form a switching component 60, with both components connected to the ring line 40, while the line 50 forms the main channel. Also, disposed in the ring line 40 is a central control component 30, with all actuating components to be associated therewith being operatively disposed at one side of such control component and all switching components to be associated therewith being disposed at the other side thereof. The actuating, control and switching components each include two connection units 201 and 202, 301 and 302, and 601 and 602 respectively, each of which is provided with five terminals for five-wire lines or foil lines, with the terminals being designated by reference numerals 2011 to 6025.

The coder 31 includes a digital counter 25 which can be set and started over a setting input 254 by means of a setting and start pulse, at selected starting values, which may be present in the form of a digital word at parallel inputs 251 to 253, and in addition thereto a store 26 for a start value, a gate 27 with at least two inputs, and a converter 28 which converts the command signal, produced by the command transmitter 11, into a digital pulse which is supplied at its output 281. Such output of the converter is connected over the gate 27 to the setting input 254 of the counter, the second input of the gate 27 being connected to a bus-line 90, while the counting input 255 of the counter is connected to a pulse train line 80.

The counter includes an auxiliary device having a first output 256 from which coded counting pulses are supplied during the counting period extending from the start value to a predetermined end counting value, and with a second output 257 from which a blocking pulse, having the width of the counting period, is supplied during such counting period. The first output of the auxiliary device is connected to the main channel 50 by an electric line which forms the branch channel 51 (see FIG. 2), while the second output 257 is connected to the bus-line 90. Both the auxiliary device and the converter will be subsequently described in greater detail.

The store 26 advantageously may be constructed as a programmable fixed word store, which advantageously can be so designed that extending from each individual line of the ring line 40 is a tap line which branches off to the parallel inputs of the counter, which branches can be readily opened. In most commercially available logic modules such as counters, etc., free inputs are connected in determinate fashion to supply potential ("1" with a positive logic). In such case it is merely necessary to provide a tap line extending from the ground line. Such a tap line is designated in FIG. 5 by the numeral 261, and branches off to the parallel inputs 251 to 253. For example, only the branch which would extend to the input 251 is opened, so that the start value for the counter is determined by the digital word "100", (the lower conductor of the ring line 40 being considered throughout as the ground conductor with the other line being considered the supply line). The central control component 30, in this embodiment, contains a central power supply device 35 which may be a battery or a supply line which is operative to supply the low current loads connected to the ring line. In addition, such component includes a central counting pulse generator 36, the output line 361 of which supplies counting pulse trains over the pulse train line 80 to the counting inputs of the counters connected thereto, as well as a first monostable multivibrator 37 which is controlled by the front flank of a pulse and a second monostable multivibrator 38 which is controlled by the rear flank of a pulse, both of which have their inputs connected to the bus-line 90. Lines 901 and 902 respectively connect the outputs 371 and 381 of the two multivibrators to the decoders.

The decoder 61 in the switching component 60 includes a counter 65 which can be set at a selectible start value, counting in a predetermined direction and adapted to be read out in parallel over parallel outputs 651 and 656. Also provided is a decoder 66. The counting input of the counter 65, designated by the reference numeral 657, is connected to the main channel 50 over an electric line which forms the branch channel 55, while the setting input 658 is connected to the line 901, which is operable to set the counter at the predetermined start value and to start the counting process, while the activation input 660 is connected to the line 902. The output 667 of the decoder and the lower line 40 are connected over line 71 to the switching device 81. The parallel outputs of the counter can be selectively connected to the parallel inputs of the decoder, which will be discussed in greater detail in connection with the description of the operation of this switching arrangement.

All lines between the individual components can be in the form of multi-wire lines, for example, foil lines, or multi-wire strip cable, while the wiring in the individual components, may be of permanent form, for example in the form of a printed circuit. It will be appreciated that individual parts of the coder and decoder can be in the form of discrete, commercially available logic modules or can be produced as monolithically integrated circuits.

For the sake of clarity and simplicity, the supply lines to the counters, gates, converters, etc. have not been illustrated in FIG. 5.

Figure 6:
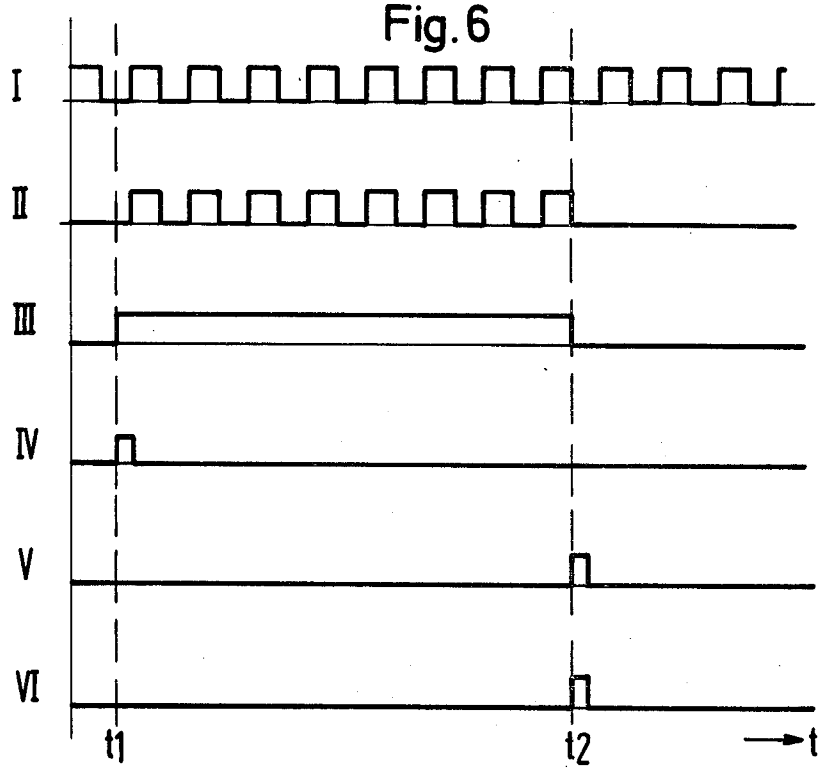
FIG. 6 represents a pulse diagram with respect to time t, for explanation of the manner of operation of the switching arrangement illustrated in FIG. 5.

Reference is made to FIG. 6 in connection with the operation of the switching device illustrated in FIG. 5, in which figure pulse diagrams I to VI are illustrated with respect to time t. Timing pulses I produced by the counting pulse generator 36 are present at the counting inputs of the counters of all actuating components, and upon the actuation of one of the command transmitters at the time $t_1$, for example, the command transmitter 11, converter 28 supplies a short pulse from its output 281, which is conducted over gate 27 (in FIG. 5 a NOR-gate) to the setting input 254 of the counter 25. The front flank of such pulse causes the counter 25 to receive the digital word (for example the word "100") contained in the store 26 and to start to count in the direction of the predeterminable counting end value, for example, "000" or "111". Simultaneously therewith, the auxiliary device supplies a blocking pulse III at the output 257, which is conducted over line 90 and simultaneously supplied to the gates of all the actuating components. Timing pulses II are supplied at the output 256 of the auxiliary device until the predeterminable counting end value has been attained. With the last pulse of the timing pulses II, the pulse III, supplied from the auxiliary device at the output 257, is terminated. Timing pulses II are conducted over the line 50 directly to the counting inputs of the counters of all the decoders, while the pulse III is conducted over the lines 90 to the two monostable multivibrators 37 and 38 in the control component 30.

The front flank of the pulse III actuates the monostable multivibrator 37 whose output pulse IV is conducted to the setting inputs of the counters of all the decoders 61, and simultaneously therewith the timing pulses II are conducted to the counting inputs of the counters of all the decoders. Upon the supply of the pulse IV from the multivibrator 37, the counters in the decoders start to count the number of pulses II from predeterminable start values, and at the end of the last of the pulses II at time $t_2$, the rear flank of pulse II actuates the multivibrator 38 whereby the latter supplies the actuation pulse V to the decoders. However, only those decoders which are set at the end counting value predetermined by the number of pulses II, and reached thereby, now supply a switching pulse VI at their outputs.

The predeterminable start value and the counting direction of the counters in the decoders basically can be selected in an arbitrary manner, the predetermination of the latter merely requiring that the decoder be correctly set at the coded end counting value.

To make the setting of the decoders as uncomplicated as possible, it is expedient to have the start-counting values and end counting values in the counter 65 of the decoders take the form of the start counting values and end counting values of the counters in the assigned coders. In this case, it is possible to differentiate between two situations: (a) The counter decoder is set at the end counting value of the counter in the assigned coder and counts in the direction of the start value of the assigned coder. (b) The counter in the decoder is set at the start value of the counter in the associated coder and counts in the direction of the end counting value of the counter in the associated coder.

In situation (a) the decoder must be set at the start value of the counter in the associated coder while in situation (b) at its end value. In connection with situation (b), as the start values of the counters in the decoders vary, it is necessary that the counters in the decoders should be such that they can be set at selectable start values. The setting to the start value can be effected in the same manner as in coders with a programmable fixed word store. It is also expedient for the counter in the respective coders to count up to an end counting value which is the same for all counters.

As previously mentioned with respect to FIG. 5, the decoder can be an AND-gate, in which case only those parallel outputs of the counter in the decoder, which present a logic "1" when the coded end counting value is arrived at in the counter, are connected to a parallel input of the gate. All the other parallel inputs of the gate are permanently connected to a logic "1". (In most commercially available gates, it is sufficient to leave such inputs open.) While misconnections can occur, this can be safely avoided with the inverted end counting value is additionally utilized. Such inverted end counting values usually are available at parallel outputs in the counters.

Thus, for example, it may be assumed in the circuit of FIG. 5 that the parallel outputs 652, 653 and 655 are outputs for the counting value, while the parallel outputs 651, 654 and 656 are outputs for the inverted counting value. Only parallel outputs which exhibit a logic "1" when the end counting value is reached are connected to an input of the gate, which must, of course, possess at least as many parallel inputs as the number of parallel outputs provided in the counter. In FIG. 5, the digital word "100", for example, has been assumed to be the end counting value and the highest bit will be assumed to be present at the output 651. The inverted end counting value is the digital word "011". Consequently, as illustrated in FIG. 5, the parallel outputs 651, 654 and 656 each must be connected to a parallel input of the gate. The activation pulse for the activation input 660 of the gate naturally must be a "1" pulse.

Figure 7:
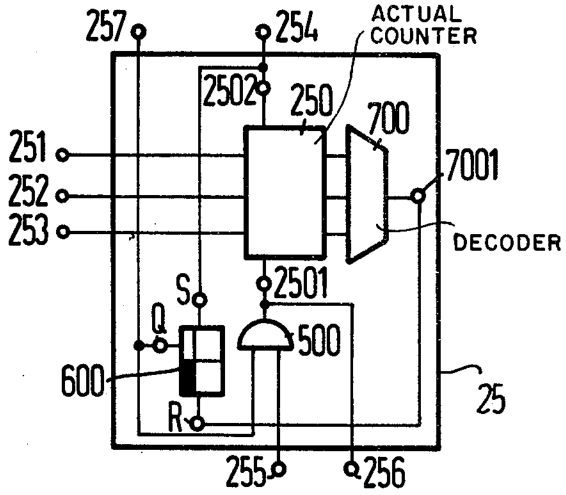
FIG. 7 schematically illustrates the construction of an auxiliary device in the counter of a coder.

FIG. 7 illustrates the counter 25 and auxiliary device included therewith, with the unit comprising the actual counter 250, a decoder 700, a gate 500 (AND-gate) with two inputs and an RS flip-flop 600. The counter input 2501 of the actual counter 250 is connected to the output of the gate 500, one input of which forms the counting input 255 of the counter 25, and in addition the input 2501, forming the counting input of the actual counter, is connected to the first output 256 of the counter 25. The other input of the gate is connected to the Q-output of the flip-flop 600. The output 7001 of the deocder 700 is connected to the resetting input R of the flip-flop, while the S-input thereof is connected to the setting input 254 of the counter 25, which input simultaneously forms the setting input of the actual counter 250. The Q-output of the flip-flop is also connected to the second output 257 of the counter 25. The actual counter 25 is of a type which can be read out in parallel and which possesses parallel outputs at which the count can be obtained and which, in turn, are connected to parallel inputs of the decoder 700. The actual counter naturally must be a counter which can be set to selected start values, and the parallel inputs 251 to 253 of the counter 25 simultaneously form the parallel inputs of the actual counter.

It is expedient to employ binary counters which have a zero-transition switching unit, or to use an overflow switching unit. Such counter then already includes the decoder 700 in the form of one of such switching units. Such counters are commercially available, for example, such as illustrated and described in the Siemens Datenbuch 1974/1975, vol. 1, "Digitale Schaltungen MOS", pages 186–188.

In the operation of the circuit of FIG. 7 a setting pulse at the input 254 simultaneously sets the flip-flop 600, as a result of which the AND-gate 500 permits passage of timing pulses. Simultaneously therewith, the blocking pulse is present at the second output 257. The counter counts the timing pulses which reach the input 2501 and which are simultaneously supplied at the output 256. If the predetermined end counting value is reached in the counter, the decoder which has been set at such value supplies from its output 7001 a pulse which resets the flip-flop and thus blocks the gate, and simultaneously therewith all the actuating components are again released for actuation.

Figure 8:
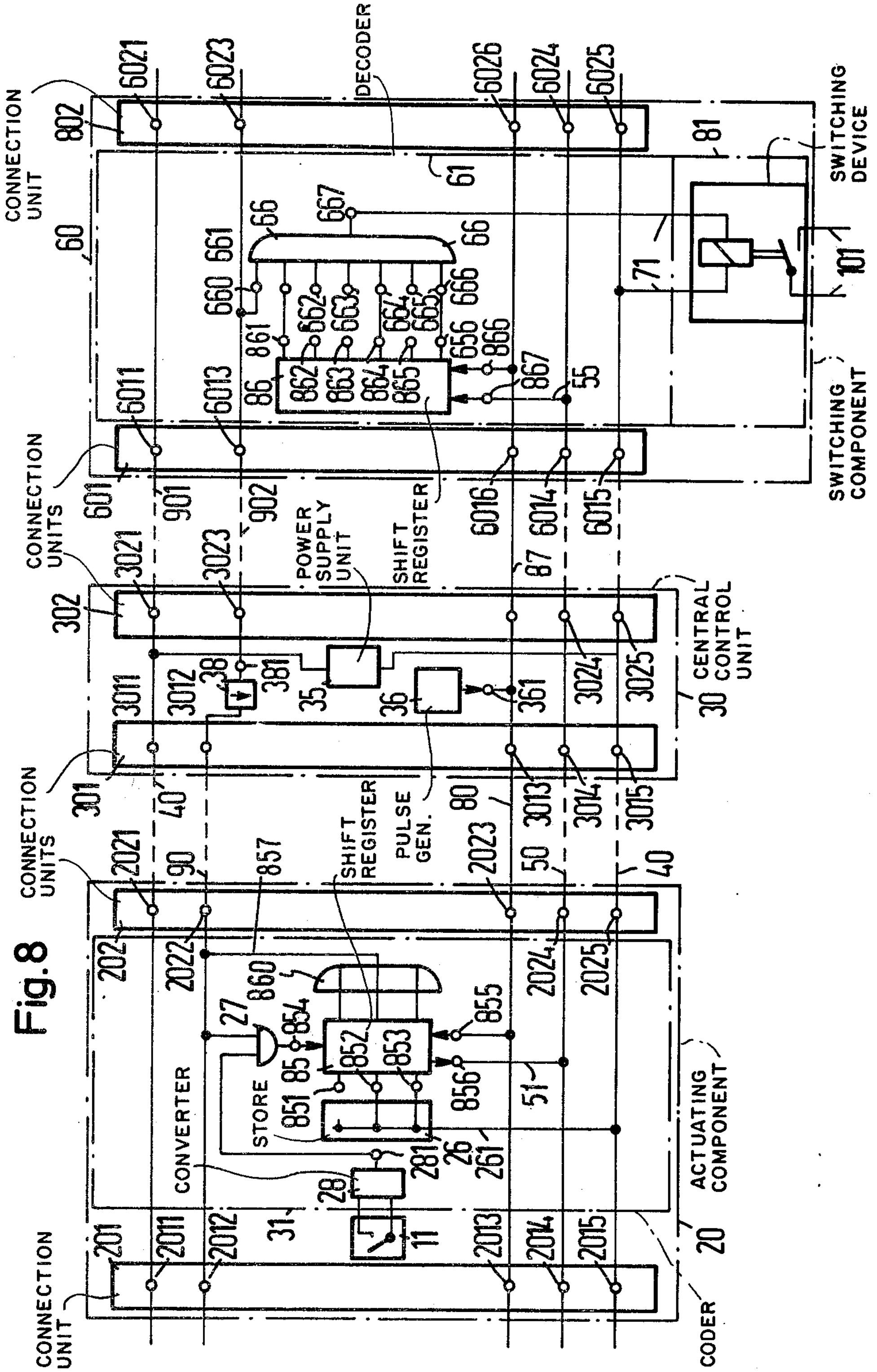
FIG. 8 illustrates a modified circuit of a switching arrangement corresponding to that illustrated in FIG. 5.

FIG. 8 illustrates a modified embodiment of the switching device illustrated in FIG. 5 and parts identical with those of the circuit of FIG. 5 are therefore designated by the same reference numerals. The primary difference between the circuit of FIG. 8 and that of FIG. 5 is that a parallel series shift register 85 is employed in the coder in place of the counter 25, which shift register can be set independently of the pulse train utilized, and in the decoder 61 a series-parallel-shift register 86 is provided, which can be set independently of the pulse train.

The parallel inputs 851, 852 and 853 of the shift register 85 are connected to the outputs of the store 26, while the output of the gate 27 is connected to the setting input 854, and the counting pulse train input 855 is connected to the line 80, which the series output 856 being connected to the main channel over an electric line as branch channel 51.

The parallel outputs 861 to 865 of the shift register 86 in the decoder are, as in FIG. 5, connected to the decoder 66 and the series input 867 of the register is connected to the main channel 50 over an electric line as branch channel 55. The pulse train input 866 of the register 86 is connected over an additional terminal 6016 on the connection unit 601, to the output 361 of the pulse generator 36 and to an output terminal 6026 on the connection unit 802, by a line 87.

An auxiliary device in the actuating components also ensures that during the shift duration of one of such actuating components, actuation of all other actuating components is blocked. Such an auxiliary device can, for example, be derived by an arrangement in which each parallel series shift register possesses parallel outputs which are connected to an OR-gate, such OR-gate in FIG. 8 being designated by reference numeral 860, with the output of such OR-gate being connected to the line 90. In the embodiment illustrated in FIG. 8, the monostable multivibrator 37 in the control component, as well as the terminal 6012 of the connection units 601, of FIG. 5, can be omitted, whereby each connection unit requires only five terminals.

In the operation of the circuit illustrated in FIG. 8, as a result of the actuation of the command transmitter 11, the shift register 85 is set, over its setting input 854, to the start value contained in the store 26. Simultaneously therewith, the output of the gate changes to a logic "1" and thus also the line 90. As a result, actuation of all other actuating components are blocked for the shift duration. The set value appears at the series output 856 and is conducted over the series input 867 into the series-parallel shift register 86, and when the highest set bit of the start value is supplied from the shift register 85, the output of the OR-gate is again set to a logic "0". As a result, the monostable multivibrator 38 is actuated and the pulse supplied thereby is operative to actuate the decoder 66. At this instant the start value of the store 26 is contained in the shift register 86, and the latter supplies the switching pulse.

Instead of the provision of an OR-gate as a decoder in the switching device shown in FIG. 8, a monostable multivibrator also advantageously can be utilized in the coder. In such case, the multivibrator would have its input connected to the setting input 854 and its output connected to the line 90, whereby a setting pulse at the setting input 854 would be operative to start the multivibrator which supplies an output pulse, functioning as a blocking pulse, to the line 90. The duration of the output pulse naturally is at least equal to the shift duration required for the supply of the start value from the register. It is advantageous to utilize a fixed shift duration in all of the actuating components, for example, 8 pulse trains for 256 load devices.

The supply conductors leading from the pair of lines 40 to the low voltage load devices, for the sake of clarity, have not been illustrated in FIG. 8.

The shift registers can, for example, be in the form of shift registers described in the Siemens Datenbuch 1974/1975, Vol. 1, "Digitale Schaltunger MOS" on pages 209–214. Such a register is in the form of a 8-bit shift register having parallel inputs designated by reference letters A to H, and parallel outputs designated by reference letters $O_A$ to $O_H$. The setting input is referenced $\overline{S}_r$ and $\overline{S}_l$ (right-left shift operation), whereas the pulse train input is designated by the reference letter T. Either output $O_H$ or $O_A$ can be utilized as the series output in dependence upon the direction of shift involved.

In comparison to the switching device of FIG. 5, utilizing counters, one of the advantages of the switching device illustrated in FIG. 8 utilizing shift registers, is that in the case of an n-position shift register, ay one of the possible coded signals requires only a maximum of n-shift pulses for $2^n - 1$ load devices, whereas in n-position counters, a maximum of $2^n$ counting pulses are required for such purpose. Thus, when shift registers are utilized, a generally shorter transmission duration is involved coupled with a higher degree of freedom from interference.

It also is of advantage to have the timing pulse generator, producing the counting or shift pulses, operate only for the duration of the counting or shift operations. In switching devices utilizing a central pulse generator as illustrated in FIGS. 5 and 8, this can readily be accomplished by having the blocking pulse also control the pulse generator. In such event, the front flank of the blocking pulse may function over an electronic switch, to switch on the pulse generator while the rear flank may function to reopen the electronic switch. Advantageously, the power loss of the pulse generator is thereby considerably reduced. Likewise, the pulse generator will be temporarily actuated when a command transmitter is actuated.

The outputs 256 and 856 in the circuits of FIGS. 5 and 8 are illustrated as being directly connected to the line 50, which has been done only for purposes of clarity. In a practical application, such outputs must of course, be decoupled, which can be readily effected in a simple manner by connecting all the outputs to the line 50 over a common "OR" circuit. In this case a wired "OR" circuit is particularly suitable, and construction of such circuits is described by Walter Wolfgarten in Binäre Schaltkreise", 1972, published by Dr. Alfred Huthig Verlag, Heidelberg, pages 59–60. Bus-systems also are suitable and such systems are likewise described in detail in "Binäre Schaltkreise" on page 202 ff. The same considerations are valid for the outputs 257 and 857 of FIGS. 5 and 8 and line 90.

Figure 9:
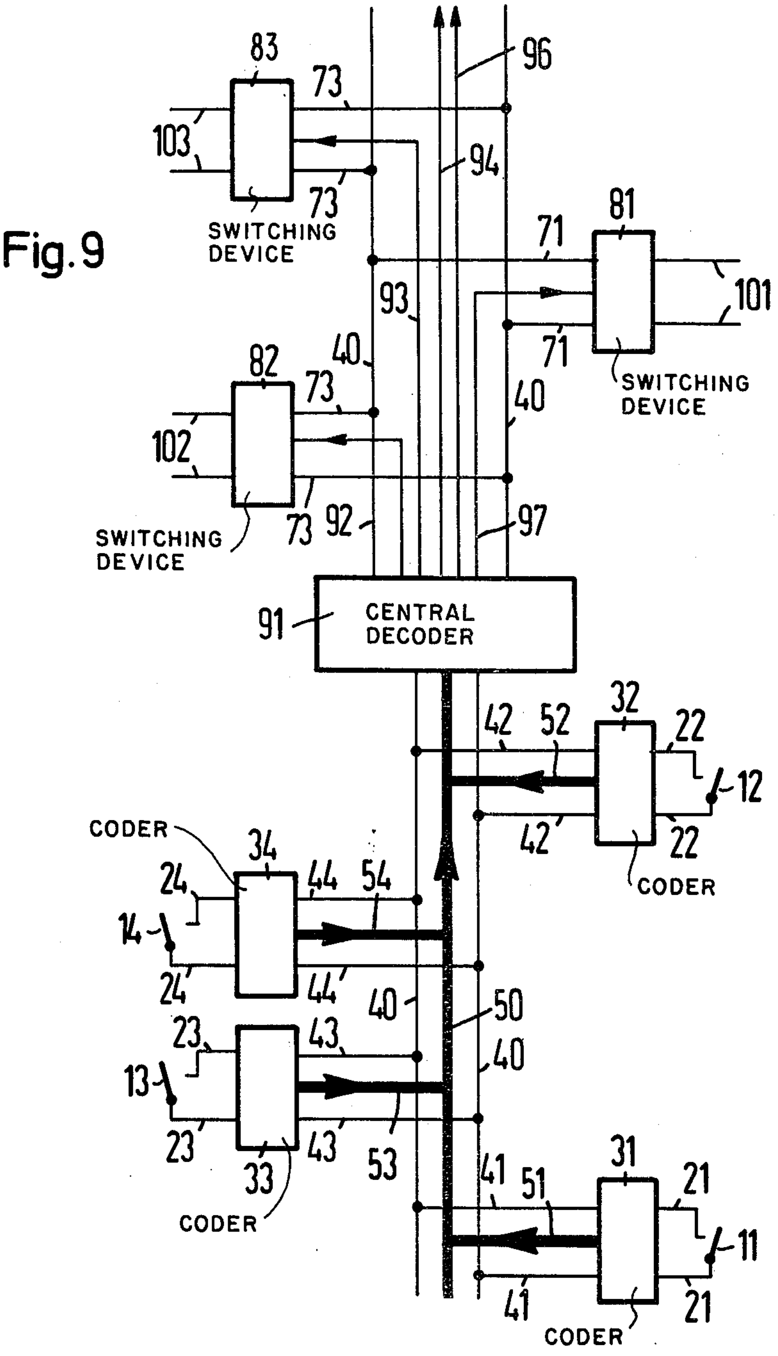
FIG. 9 illustrates a switching arrangement employing a central decoder.

FIG. 9 illustrates a block circuit diagram of a switching device utilizing a central decoder, with corresponding components and lines being designated by reference numerals corresponding to those appearing in FIG. 2. The main transmission channel 50 extends to the central decoder 91, while a group of transmission channels 92 to 97 extend from the output side of the central decoder to respective switching components.

An advantage and simple arrangement utilizing the block circuit diagram illustrated in FIG. 9 may be achieved if electrical digital signals are utilized with transmission in parallel over multiwire electric lines, for example, with m number of conductors. In such case, a "1 from m" decoder can be utilized as the central decoder, such type of decoder being illustrated and described, for example, in Siemens Datenbuch 1974/1975 Vol. 1, "Digitale Schaltungen MOS" on pages 337–339. Each coder produces a digital word assigned thereto and the central decoder allocates such digital word to one of its outputs with each output of the central decoder being connected, by an electric line, to a respective corresponding switching component. As a result, each actuating component is assigned a single specific switching component. The safeguard against miscoding can be increased in a very simple manner by insuring that the digital signals are connected at the input of the central decoder for merely a very short period of time (for example, <1 ms).

The coders can be produced in a very simple manner by providing each with a plurality of parallel connected amplifiers, with the number of amplifiers being selected equal to the number of bits contained in the associated digital word. The other lines may be connected either to ground or to a supply voltage, and the inputs of the amplifiers are connected to the output end of the command transmitter or converter. The command transmitters should in this case be so constructed that when actuated they will momentarily supply a pulse.

Figure 10:
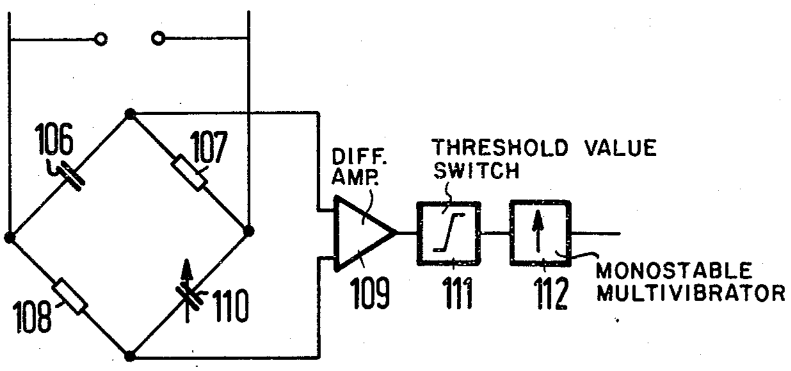
FIG. 10 is a schematic diagram illustrating the construction of a converter.

FIG. 10 illustrates an example of a command transmitter comprising a capacitor 110 having a variable capacitance and a converter connected thereto, which arrangement can be utilized for all of the switching devices herein described. An RC-bridge circuit, which is balanced to zero, comprises a capacitor 110, a capacitor 106 and two resistors 107 and 108 is connected to an a.c. voltage source. In the switching devices illustrated in FIGS. 5 and 8, the central counting pulse generator can be used for this purpose whereby, in each actuating component, the bridge circuit merely requires a connection to the ground line (lower line 40, FIG. 5 or FIG. 8), and to the pulse train line 80. The voltage produced by a change in the capacitance of the capacitor 110 (for example by proximity or contact) is amplified by a differential amplifier 109 which is operatively connected to the bridge, with the output of the differential amplifier being supplied to a threshold value switch 111, operative to convert the a.c. voltage at the output of the differential amplifier into rectangular pulses. The output of the threshold value switch is supplied to a monostable multivibrator 112 which is started by the first pulse from the threshold value switch and supplies a longer pulse at its output, which constitutes a setting pulse effecting suppression, for a predetermined length of time, of possible disturbing following pulses from the threshold value switch. The pulse length of the output pulse should correspond approximately to that of an average natural actuation time of the actuation of the command transmitter. With respect to switching arrangements such as illustrated in FIG. 5 and FIG. 8, the output pulse should be additionally longer than the blocking pulse, to prevent disturbances in the counting operation. The output pulse can be used either directly as an output pulse of the converter, or, if necessary, can be converted by a front-flank controlled monostable multivibrator into a pulse having a duration which is a short as is required and which then forms the output pulse of the converter. Circuits with command transmitters and converters are also described in "Electronic Circuits Manual", 1971, published by McGraw and Hill.

Having thus described our invention it will be obvious that although various minor modifications might be suggested by those versed in the art, it should be understood that we wish to embody within the scope of the patent granted hereon all such modifications as reasonably, and properly come within the scope of our contribution to the art.

We claim as our invention:

1. In a switching device for remote-controlled electrical load devices, which either individually or in groups can be selectively controlled by at least one command transmitter which produces an electric switching signal, from one or more than one position over at least one switching device which is connected by a low voltage, low current circuit composed of at least a supply and a return line to the command transmitter, and is connected by electric lines to at least one electrical load device, the combination of one coder disposed in the low voltage, low current circuit between each command transmitter and each switching device, which coder converts a switching signal produced by said command transmitter and transmitted to said coder over a first part of said low voltage, low current circuit in a coded signal, one decoder disposed in the low voltage, low current circuit between the coder and the switching device, and a separate transmission channel between said coder and said decoder over which the coded signal can be supplied to the decoder, with the latter converting the coded signal into a switching signal for actuating the switching device over a second part of said low voltage, low current circuit.

2. A switching device as claimed in claim 1, wherein the low current circuit is in the form of at least one ring line, to which each coder and each switching device are connected by branch lines.

3. A switching device as claimed in claim 1, wherein a separate decoder is provided for each switching device.

4. A switching device as claimed in claim 3, wherein the transmission channel is in the form of at least one main channel into which at least a branch channel connects from each coder, and which has a branch channel branching off from it to each decoder.

5. A switching device as claimed in claim 3, wherein the decoder and the switching device are combined to form a single structural unit.

6. A switching device as claim in claim 5, wherein the structural unit includes a connection unit for multi-wire lines.

7. A switching device as claimed in claim 3 wherein each coder includes at least one digital counting circuit, which upon actuation of the command transmitter can be set at a coded start value, and is operative to count timing pulses supplied by a timing pulse generator to the counting pulse train input of the digital counting circuit, operative to supply pulses to the transmission channel until a fixed end counting value is reached in the counting circuit.

8. A switching device as claimed in claim 7, wherein the digital counting circuit is a parallel-series shift register which can be set independently of the pulse train and whose series output is connected to the transmission channel.

9. A switching device as claimed in claim 8, wherein each decoder includes a digital counting circuit which counts the pulses emitted from the coder, and a device which checks the relevant counting value in the counting circuit and emits the switching signal at the coded end counting value.

10. A switching device as claimed in claim 8, wherein a digital counter circuit in the decoder is a series-parallel shift register which can be set independently of the pulse train and whose series input is connected to the transmission channel.

11. A switching device as claimed in claim 10, wherein the shift pulse train input of the series-parallel shift register is connected to a central timing pulse generator.

12. A switching device as claimed in claim 11 wherein the digital counting circuit of each coder includes a device which emits a blocking pulse from an output for the duration of the counting process in the digital counting circuit, which blocking pulse is supplied over at least one transmission line to a gate in each coder, blocking such gates for the duration of the blocking pulse with respect to the setting pulses and start pulses produced by the command transmitter.

13. A switching device as claimed in claim 12, wherein two monostable multivibrators are provided, whose inputs can be supplied with the blocking pulse, one multivibrator of which responds to the front flank, and the other of which responds to the rear flank of the blocking pulse, the front flank of the output pulse of the one multivibrator forming a start pulse for the digital counting circuit and the rear flank of the output pulse of the other multivibrator forming an activation pulse for the decoder.

14. A switching device as claimed in claim 10, wherein the digital counting circuit of each coder includes a device which emits a blocking pulse from an output for the duration of the counting process in the digital counting circuit, which blocking pulse is supplied over at least one transmission line to a gate in each coder, blocking such gates for the duration of the blocking pulse with respect to the setting pulses and start pulses produced by the command transmitter.

15. A switching device as claimed in claim 14, wherein two monostable multivibrators are provided, whose inputs can be supplied with the blocking pulse, one multivibrator of which responds to the front flank, and the other of which responds to the rear flank of the blocking pulse, the front flank of the output pulse of the one multivibrator forming a start pulse for the digital counting circuit and the rear flank of the output pulse of the other multivibrator forming an activation pulse for the decoder.

16. A switching device as claimed in claim 7, wherein the low current circuit is in the form of at least one ring line, to which each coder and each switching device are connected by branch lines, such ring line containing a central control component which includes at least one supply component for the ring line and a central timing pulse generator supplied from the same source, operative to produce timing pulses for all digital counting circuits, and which is so disposed that the output of the timing pulse generator is connected to the counting pulse train input of each coder.

17. A switching device as claimed in claim 16, wherein each decoder includes a digital counting circuit which counts the pulses emitted from the coder, and a device which checks the relevant counting value in the counting circuit and emits the switching signal at the coded end counting value.

18. A switching device as claimed in claim 16, wherein the digital counting circuit of each coder includes a device which emits a blocking pulse from an output for the duration of the counting process in the digital counting circuit, which blocking pulse is supplied over at least one transmission line to a gate in each coder, blocking such gates for the duration of the blocking pulses with respect to the setting pulses and start pulses produced by the command transmitter.

19. A switching device as claimed in claim 18, wherein two monostable multivibrators are provided, whose inputs can be supplied with the blocking pulse, one multivibrator of which responds to the front flank, and the other of which responds to the rear flank of the blocking pulse, the front flank of the output pulse of the one multivibrator forming a start pulse for the digital counting circuit and the rear flank of the output pulse of the other multivibrator forming an activation pulse for the decoder.

20. A switching device as claimed in claim 16, wherein the central component includes at least one connection unit for foil lines.

21. A switching device as claimed in claim 16, wherein the central component includes at least one connection unit for multi-wire lines.

22. A switching device as claimed in claim 7, wherein each decoder includes a digital counting circuit which counts the pulses emitted from the coder, and a device which checks the relevant counting value in the digital counting circuit and emits the switching signal at the coded end counting value.

23. A switching device as claimed in claim 22, wherein the digital counting circuit in the decoder is a series-parallel shift register which can be set independently of pulse train and whose series input is connected to the transmission channel.

24. A switching device as claimed in claim 23, wherein the digital counting circuit of each coder includes a device which emits a blocking pulse from an output for the duration of the counting process in the digital counting circuit, which blocking pulse is supplied over at least one transmission line to a gate in each coder, blocking such gates for the duration of the blocking pulse with respect to the setting pulses and start pulses produced by the command transmitter.

25. A switching device as claimed in claim 24, wherein two monostable multivibrators are provided, whose inputs can be supplied with the blocking pulse, one multivibrator of which responds to the front flank, and the other of which responds to the rear flank of the blocking pulse, the front flank of the output pulse of the one multivibrator forming a start pulse for the digital counting circuit and the rear flank of the output pulse of the other multivibrator forming an activation pulse for the decoder.

26. A switching device as claimed in claim 22, wherein the digital counting circuit of each coder includes a device which emits a blocking pulse from an output for the duration of the counting process in the digital counting circuit, which blocking pulse is supplied over at least one transmission line to a gate in each coder, blocking such gates for the duration of the blocking pulse with respect to the setting pulses and start pulses produced by the command transmitter.

27. A switching device as claimed in claim 1, wherein each coder produces a digitally coded signal.

28. A switching device as claimed in claim 27, wherein the coder produces an electric signal and the transmission channel consists of at least one electric line.

29. A switching device, as claimed in claim 28, wherein the electric signal comprises a coded digital word which, upon actuation of the command transmitter, is temporarily applied to parallel outputs of the coder, and can be transmitted in parallel on multi-wire lines.

30. A switching device as claimed in claim 29, wherein each coder includes a timing pulse generator and at least one digital counting circuit, which upon actuation of the command transmitter can be set at a coded start value, and is operative to count timing pulses supplied by said timing pulse generator, and supply pulses to the transmission channel until a fixed end counting value is reached in the digital counting circuit.

31. A switching device as claimed in claim 28, wherein the electric signal comprises a coded pulse sequence which is transmitted over a line.

32. A switching device as claimed in claim 1, wherein a blocking device is provided which during the transmission of the coded signal, blocks the emission of a signal from the other coders.

33. A switching device as claimed in claim 1, wherein a digital counting circuit of each coder includes a device which emits a blocking pulse from an output for the duration of the counting process in the digital counting circuit, which blocking pulse is supplied over at least one transmission line to a gate in each coder, blocking such gates for the duration of the blocking pulse with respect to the setting pulses and start pulses produced by the command transmitter.

34. A switching device as claimed in claim 33, wherein two monostable multivibrators are provided, whose inputs can be supplied with the blocking pulse, one multivibrator of which responds to the front flank of said blocking pulse, and the other of which responds to the rear flank of the blocking pulse, the front flank of the output pulse of the one multivibrator forming a start pulse for the digital counting circuit and the rear flank of the output pulse of the other multivibrator forming an activation pulse for the decoder.

35. A switching device as claimed in claim 1, wherein the command transmitter and coder are structurally combined to form a single actuating component.

36. A switching device as claimed in claim 35, wherein the actuating component includes at least one connection unit for foil lines.

37. A switching device as claimed in claim 36, wherein the connection unit is a quick connect terminal.

38. A switching device according to claim 35, wherein the actuating component includes a connection unit provided with terminals for the connection of transmission lines.

39. A switching device as claimed in claim 38, wherein the command transmitter, coder and connection unit are disposed on a thin carrier plate, preferably having a thickness of less than 5 mm, with the terminals of the connection unit being connected to the output and supply terminals of the coder, and with the input of the coder being connected to the output of the command transmitter.

40. A switching device as claimed in claim 39, wherein the coder is in the form of an integrated circuit.

41. A switching device as claimed in claim 39, wherein the command transmitter comprises a variable capacitor with a capacitor electrode in the form of a sensing electrode, which capacitor is disposed at a distance of less than one meter from the coder upon the carrier plate, with its electrodes connected by lines to the input of the coder.

42. A switching device as claimed in claim 41, wherein the coder includes a high frequency generator and a bridge circuit which latter can be detuned when an operation approaches or contacts the sensing electrode.

43. A switching device as claimed in claim 41, wherein the coder includes an oscillator, whose oscillation build-up is established or discontinued by changes in capacitance of said variable capacitor.

44. In a switching device for remote-controlled electrical load devices, which either individually or in groups can be selectively controlled by at least one command transmitter which produces an electric switching signal, from one or more than one position over at least one switching device which is connected by a low voltage, low current circuit composed of at least a supply and a return line to the command transmitter, and is connected by electric lines to at least one electrical load device, the combination of one coder disposed in the low voltage, low current circuit between each command transmitter and each switching device, which coder converts the switching signal produced by said command transmitter and transmitted to said coder over a first part of said low voltage, low current circuit into a coded signal, one central decoder disposed in the low voltage, low current circuit between the coder and a plurality of switching devices, a separate transmission channel between said coder and said central decoder over which the coded signal can be supplied to the central decoder, with the latter converting the coded signal into a switching signal for actuating at least one switching device over at least one separate transmission channel, the latter being individually allocated to said switching device.

45. A switching device as claimed in claim 44, wherein the transmission channel is in the form of at least one main channel into which at least a branch channel connects from each coder, and which connects into the central decoder.

46. A switching device as claimed in claim 45, wherein each coder includes at least one digital counting circuit, which upon actuation of the command transmitter can be set at a coded start value, and is operative to count timing pulses supplied by a timing pulse generator to the counting pulse train input of the digital counting circuit, operative to supply pulses to the transmission channel until a fixed end counting value is reached in the digital counting circuit.

47. A switching device as claimed in claim 45, wherein each coder includes a digital word store in which in each case, a coded digital word can be stored, which word can be temporarily supplied to the transmission channel comprising of parallel electric lines on the actuation of the command transmitter.

48. A switching device as claimed in claim 47, wherein the digital word store is a programmable fixed word store.

49. A switching device as claimed in claim 48, wherein the central decoder comprises a 1 from m decoder where m is the number of bits of the digital words fed to its input side, and that in each case one of its $2^m$ outputs is connected to a specific switching device.

50. A switching device as claimed in claim 44, wherein each coder includes a digital word store in which in each case, a coded digital word can be stored, which word can be temporarily supplied to the transmission channel comprising of parallel electric lines on the actuation of the command transmitter.

51. A switching device as claimed in claim 50, wherein the digital word store is a programmable fixed word store.

52. A switching device as claimed in claim 51, wherein the central decoder comprises a 1 from m decoder where m is the number of bits of the digital words fed to its input side, and that in each case one of its $2^m$ outputs is connected to a specific switching device.

* * * * *